US006631234B1

(12) United States Patent
Russell et al.

(10) Patent No.: US 6,631,234 B1
(45) Date of Patent: Oct. 7, 2003

(54) PHOTONIC CRYSTAL FIBERS

(75) Inventors: Philip St. John Russell, Bath (GB); Timothy Adam Birks, Bath (GB); Jonathan Cave Knight, Bath (GB)

(73) Assignee: Blazephotonics Limited, Bath (GB)

( * ) Notice: Subject to any disclaimer, the term of this patent is extended or adjusted under 35 U.S.C. 154(b) by 0 days.

(21) Appl. No.: 09/890,802

(22) PCT Filed: Feb. 18, 2000

(86) PCT No.: PCT/GB00/00599

§ 371 (c)(1), (2), (4) Date: Nov. 8, 2001

(87) PCT Pub. No.: WO00/49435

PCT Pub. Date: Aug. 24, 2000

(30) Foreign Application Priority Data

Feb. 19, 1999 (GB) .............................. 9903918

(51) Int. Cl.[7] .................................. G02B 6/02
(52) U.S. Cl. ..................................... 385/125
(58) Field of Search ................ 385/122–126, 385/141, 142–147; 65/385, 428; 359/34, 95, 577

(56) References Cited

U.S. PATENT DOCUMENTS 5,802,236 A * 9/1998 DiGiovanni et al. ......... 385/127
6,515,305 B2 * 2/2003 Gopinath ..................... 257/79
6,522,433 B2 * 2/2003 Kelsey et al. ................ 359/34

FOREIGN PATENT DOCUMENTS

EP  0 810 453   12/1997
WO  00/16141   3/2000

OTHER PUBLICATIONS

*Bragg scattering from an obliquely illuminated photonic crystal fiber*, Jonathan C. Knight, Tim A. Birks, Philip St. J. Russell, John G. Rarity; Applied Optics, Jan. 20, 1998, vol. 37, No. 3, pp. 449–451.

*Silica/Air Photonic crystal Fibres*, Philip J. Russell, Tim A. Birks, Jonathan C. Knight, Robert F. Cregan, Brian J. Mangan, Jpn. J. Appl. Phys. 37, Suppl. 37–1, pp. 45–48 (1998).

*Silica–air photonic crystal fiber design that permits waveguiding by a true photonic bandgap effect*, S.E. Barkou, Jes Broeng, Anders Bjarklev, Op. Lett. 24, pp. 46–48 (1999).

*All silica single–mode optical fiber with photonic crystal cladding*, J.C. Knight, T. A. Birks, P. St. J. Russell, D.M. Atkin, Op. Lett. 21, pp. 1547–1549 (1996).

*Large Mode area photonic crystal fibre*, J.C. Knight, T.A. Birks, R.F. Cregan, P. St. J. Russell, J.P. de Sandro, Electronics Letters 34, p. 1347–1348, (1998).

*Group–velocity dispersion in photonic crystal fibers*, D. Mogilevtsev, T.A. Birks,P. St. J. Russell, Op. Lett. 23, pp. 1662–1664 (1998).

(List continued on next page.)

*Primary Examiner*—Akm Enayet Ullah
(74) *Attorney, Agent, or Firm*—Burns, Doane, Swecker & Mathis, L.L.P.

(57) ABSTRACT

A photonic crystal fiber including a plurality of longitudinal holes (220), in which at least some of the holes have a different cross-sectional area in a first region (200) of the fiber, that region having been heat-treated after fabrication of the fiber, from their cross-sectional area in a second region of the fiber (190), wherein the optical properties of the fiber in the heat-treated region (200) are altered by virtue of the change in cross-sectional area of holes (230) in that region (200).

52 Claims, 4 Drawing Sheets

OTHER PUBLICATIONS

*Multicore photonic crystal fibres*, J. C. Knight, T.A. Birks, B. J. Mangan, P. St. J. Russell, Proc. OFS12, PDP5, pp. 670–673 (1997).

*Spot Size, Adiabaticity and Diffraction in Tapered Fibres*, J.D. Love, Electronics Lett. 23, pp. 993–994 (1987).

*Biconical–taper single–mode fiber coupler*, B.S. Kawasaki, K.O. Hill, R.G. Lamont, Op. Lett.6, pp. 327–328 (1981).

*Single–mode optical fibre surface plasma wave chemical sensor*, A.J.C. Tubb, F.P. Payne, R.B. Millington, C.R. Lowe, Sensors and Actuators B 41, pp. 71–79 (1997).

*Tapered–Beam Expander for Dingle–Mode Optical–Fibre Gap Devices*, K. P. Jedrzejewski et al., Electronics Letters 22, pp. 105–106 (1986).

J.C. Knight, T.A. Birks, P. St. J. Russell and D.M. Atkin, "All–silica single–mode optical fiber with photonic crystal cladding", Opt. Lett. 21, pp. 1547–1549 (1996).

T.A. Birks, J.C. Knight and P. St. J. Russell, "*Endlessly single–mode photonic crystal fibre*", Opt. Lett. 22, pp. 961–963 (1997).

* cited by examiner

PHOTONIC CRYSTAL FIBERS

This invention relates to the field of photonic crystal fibers.

A photonic crystal fiber is a special form of optical fiber. Single-mode optical fibers are widely used in applications such as telecommunications and sensing. Such fibers are typically made entirely from solid transparent materials such as glass and each fiber typically has the same cross-sectional structure along its length. The transparent material in one part (usually the middle) of the cross-section has a higher refractive index than the rest and forms an optical core within which light is guided by total internal reflection. We refer to such a fiber as a standard fiber.

There are many well-established techniques and machines for handling and processing standard fibers; for example, cleavers use a hard knife-edge to break a fiber, giving a clean end-face, and fusion splicers use a hot electric arc to join two fibers together at their ends. One process, fusion-tapering, is used to make a variety of fiber devices for performing some function on light passing along a fiber. In that process, a fiber is locally heated until it softens and then it is stretched so as to narrow the fiber locally in the heated region. Light passing along the fiber is affected by the narrowness of the treated region. In a typical tapered single-mode fiber, the light spreads out from the core and occupies more of the surrounding cladding. If the fiber is sufficiently narrowed, the light spreads out from the core completely and is then guided by the outer boundary of the entire fiber. The fiber is typically heated by immersion in a gas flame, proximity to an electrical heater or exposure to an intense laser beam.

A tapered fiber that is cleaved at the narrowest point of the taper can act as a beam expander because the light wave has a greater cross-section at the cleave than it has in the untreated fiber. Such a beam expander can assist the launching of light into the fiber and extraction of light from the fiber.

A fiber that is tapered so that light is locally guided at its outer boundary can act as a local optical sensor. In the tapered region, the light is sensitive to the medium surrounding the fiber, whereas elsewhere it is insensitive because it is buried in the central core.

Two or more fibers that are tapered together in parallel contact can act as a fiber beam-splitter (or directional coupler), in which at least some of the light in one fiber transfers across to the other fiber in the narrowed region.

In the last few years a non-standard type of optical fiber has been demonstrated, called the photonic-crystal fiber (PCF). Typically, this is made from a single solid, and substantially transparent, material, such as fused silica glass, within which is embedded a periodic array of air holes, running parallel to the fiber axis and extending the full length of the fiber. A defect in the form of a single missing air hole within the regular array forms a region of raised refractive index, which acts as a waveguiding fiber core within which light is guided, in a manner analogous to total-internal-reflection guiding in standard fibers. Another mechanism for guiding light is based on photonic-band-gap effects rather than total internal reflection. Photonic-band-gap guidance can be obtained by suitable design of the array of air holes. Light of some propagation constants can be confined to the core and will propagate therein.

Photonic-crystal fiber can be fabricated by stacking glass capillaries and canes on a macroscopic scale into the required shape, and then holding them in place while fusing them together and drawing them down into a fiber.

The PCF has a number of technologically significant properties; for example, it can support a single-mode over a very broad range of wavelengths, it can have a large mode area and thus carry high optical powers, and it can have a large normal dispersion at the telecommunications wavelength of 1.55 microns. PCFs are typically not circularly symmetric, as a result of the stack-and-draw method typically used to make them.

Technological application of PCFs would be facilitated by handling and processing techniques parallel to those described above for standard fibers. Unfortunately, some of those techniques are not appropriate for PCFs; for example, an attempt to fusion splice two PCFs together causes the air inside them to expand explosively, destroying the fiber ends being joined.

It is an object of the invention to provide PCF optical devices analogous to standard fiber devices. It is another object of the invention to provide a process for producing such devices.

According to the invention there is provided a photonic crystal fiber including a plurality of longitudinal holes, in which at least some of the holes have a different cross-sectional area in a first region of the fiber, that region having been heat-treated after fabrication of the fiber, from their cross-sectional area in a second region of the fiber, wherein the optical properties of the fiber in the heat-treated region are altered by virtue of the change in cross-sectional area of the holes in that region.

The words "after fabrication" should be taken to mean any time after the fiber has been drawn.

The heat treatment processes that can be used are typically the same as those described above for fusion tapering of standard fibers. As with standard fibers, the heat treatment can be accompanied by stretching, to narrow the fiber down. In contrast to standard fibers, however, changes in optical properties can result without stretching the fiber at all; that is because heat treatment can allow some or all of the holes in the fiber to collapse partially or completely under the influence of surface tension. That can be achieved either with or without simultaneous stretching. Furthermore, if some of the holes are pressurized, they can be made to expand instead of collapse, and differential pressurization of the holes can, in principle, be used to create any pattern of hole collapse and expansion. As with the tapering of standard fibers, for most applications, the transitions between untreated fiber and the middle of the heat treated region must be sufficiently gradual that an acceptably small amount of light is lost along the transition—the so-called criterion for adiabaticity.

It may be that at least some of the holes have expanded in the heat-treated region.

It may be that at least some, or all, of the holes have collapsed at least partially, or completely, in the heat-treated region.

The pattern of hole collapse and/or expansions may be not circularly symmetric. The birefringence of the fiber may be altered by the lack of circular symmetry.

The fiber may have been narrowed in the heat-treated region.

The photonic crystal fiber may be included in an optical device.

The photonic crystal fiber may be included in a mode-field transformer, the transformer being arranged so that a guided mode propagating through the transformer will have its field distribution changed by propagation through the heat-treated region of the photonic crystal fiber. The shape and size of the field distribution of the guided mode in a PCF depends on the relative sizes of the air holes and their separations from each other. Thus a PCF that has been heat treated to change the sizes of the holes (or narrow down the entire fiber) can act as a mode field transformer.

The photonic crystal fiber may be included in a multi mode to single mode transformer or mode filter, in which the untreated regions of the fiber are multi mode and the heat-treated region is single mode for at least one wavelength of light. Light propagating through the treated region will be forced into a single mode and will remain substantially single mode when it passes into the untreated region, which is capable of supporting other modes; those other modes will, in an ideal fiber, remain unexcited.

The photonic crystal fiber may be included in a fiber input- or output-coupler, in which the photonic crystal fiber is cleaved in the heat-treated region. Such devices can be used to enhance the coupling of light into or out of the end of the fiber if the fiber is cleaved in the region of the heat treatment.

The fiber input- or output-coupler may be arranged so that, when a mode is propagating through the coupler, the mode pattern at the cleaved face will substantially match the mode shape of an external optical element. The external optical element may be a diode laser. Making the mode elliptical or rectangular will allow more efficient launching of light into the fiber from a diode laser source. Indeed, simply expanding the mode size will make easier launching of light from other sources into the fiber.

The fiber coupler may be included in a fiber splice, in which the fiber coupler is joined to one or more other fibers. The joining may, for example, be effected by fusion, by an adhesive or by abutment.

At least one of the one or more other fibers included in the fiber splice may be selected from the following: a cleaved photonic crystal fiber; a fiber coupler, as described above; a standard fiber; or a standard fiber that has been tapered by stretching during heat treatment and then cleaved. Controlled hole collapse provides a way of fusion splicing pairs of PCFs together. First the troublesome air holes are eliminated by their complete collapse in a portion of each fiber, as described above. It is not necessary to stretch the fibers. The fibers are cleaved at the portions where the holes have collapsed, and can then be fusion spliced, since there are no holes to explode and the mode fields will match. (If the fibers are not identical, one or both of them can be stretched so that their outer diameters match. Their mode fields will then be identical.) As an alternative to fusion splicing, two PCFs that have matched mode fields can be mechanically spliced using an adhesive in the conventional way.

A standard fiber tapered to the point where the light is guided by its outer boundary has a similar mode field to a PCF whose holes have collapsed completely and which has also been stretched to the same final diameter. The splice will then be low in loss.

A photonic crystal fiber according to the invention may be arranged so that interaction of light, propagating in the photonic crystal fiber, with the external environment is enhanced or suppressed in the heat-treated region. Such a photonic crystal fiber may be included in an optical device, such as, for example, a mode-field transformer. The interaction may facilitate measurement of a measurand of the fiber's external environment. The interaction may, for example, be with an external optical element. The optical element may comprise one or more other optical fibers. At least one of the one or more other optical fibers may be a photonic crystal fiber according to the invention or a standard fiber. The spreading out of the mode field caused by collapse of air holes will increase the intensity of the field at the outer boundary of the fiber. Light at the boundary is free to interact with the environment around the fiber. Interactions with the external environment can therefore be enhanced (or suppressed) by hole collapse (or expansion). If the light can interact with a particular property in the environment (for example, the external refractive index), the treated fiber will act as an environmental sensor. If a suitable optical element is placed next to the fiber, optical devices can be built based on the interaction with that element. In particular, the optical element can be at least one other fiber, which may be a PCF or a standard fiber and may have been fused to the first fiber during the heat treatment, in a similar process to the fabrication of fused directional couplers in standard fibers.

At least two fibers in the optical device may have been at least partly fused together by heat treatment.

Similarly, variation of the mode field can be used to control the interaction of the light in the core with any structure that has been introduced into the rest of the fiber. Examples of such structures are diffraction gratings, doped regions (which may be optically pumped to provide gain), or indeed additional guiding cores. Devices that can be based on such interactions include directional couplers, spectral filters, sensors and lasers or optical amplifiers. A photonic crystal fiber according to the invention may be arranged so that interaction of light, propagating in the photonic crystal fiber, with a structure (deliberately) introduced elsewhere in the fiber is enhanced or suppressed in the heat-treated region. Such a photonic crystal fiber may be included in an optical device. The introduced structure may, for example, be one of the following: at least one other core region in the photonic crystal fiber; a grating; or a region of doped material.

The optical device may be included in another optical device such as a directional coupler, a spectral filter, an optical sensor, a laser or an optical amplifier (which may in turn include a directional coupler).

Also according to the invention there is provided a method of producing a photonic crystal fiber, including the following steps: fabricating a photonic crystal fiber having a plurality of longitudinal holes; and heat-treating a region of the fiber so that at least some of the holes in that region have a different cross-sectional area from their cross-sectional area in regions of the fiber which have not been heat-treated, the optical properties of the fiber in the heat-treated region being altered by changing the cross-sectional area of holes in that region.

At least some of the holes may be pressurized during the heat treatment. All of the holes may be pressurized during the heat treatment.

The heat treatment may cause at least some, or all, of the air holes within the fiber to collapse completely in the treated region.

It may be that the heat treatment is not applied in a circularly symmetric manner, so that a pattern of hole collapse and/or expansion that is not circularly symmetric results. The birefringence of the fiber may thereby be altered in the heat-treated region. The polarisation properties of a PCF depend on the structure in the vicinity of the core. Controlled variation of air hole sizes and overall fiber diameter can therefore be used to modify the birefringence of the fiber.

The fiber may be narrowed locally by stretching during the heat treatment.

The heat treatment may change the physical and/or chemical state of at least some of the material within the fiber.

An embodiment of the invention will now be described, by way of example only, with reference to the accompanying drawings, of which FIG. 1 is a schematic cross-sectional view through a standard fiber.

Figure 1:
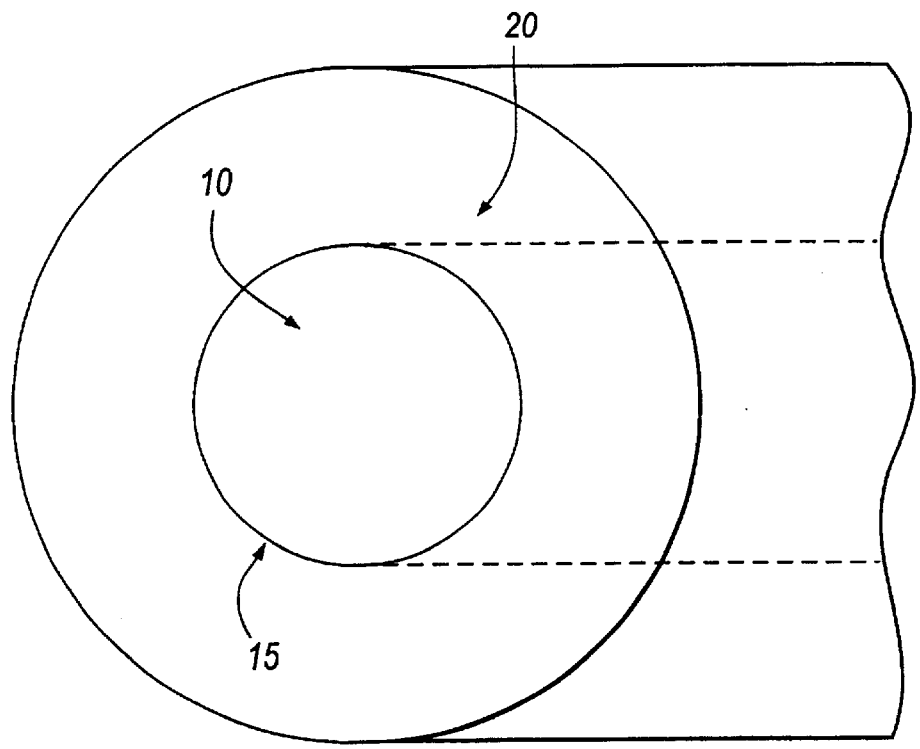

Standard fibers, such as the one shown, for example, in FIG. 1, in their simplest form comprise essentially a cylindrical core 10 and concentric cylindrical cladding 20. Typically, both the core and the cladding will be made of the same material, usually silica, but each is doped with other materials in order to raise the refractive index of the core 10 and lower the refractive index of the cladding 20. Light, of appropriate wavelengths, is confined to the core 10, and guided therein, by total internal reflection at the core-cladding boundary 15.

Figure 2A:
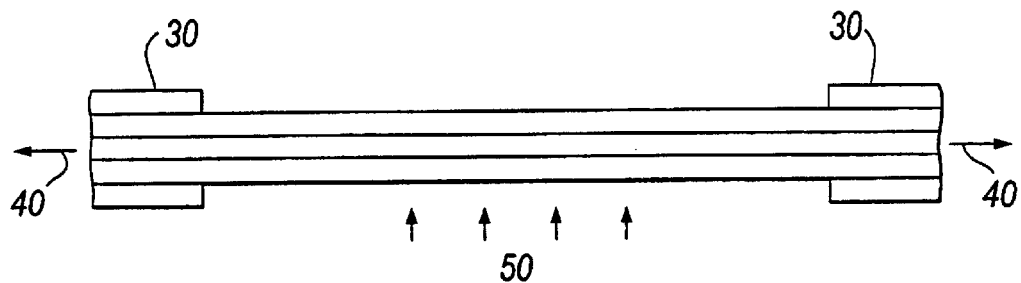
FIGS. 2a and 2b are schematic views showing heat treatment of a standard fiber.
Figure 2B:
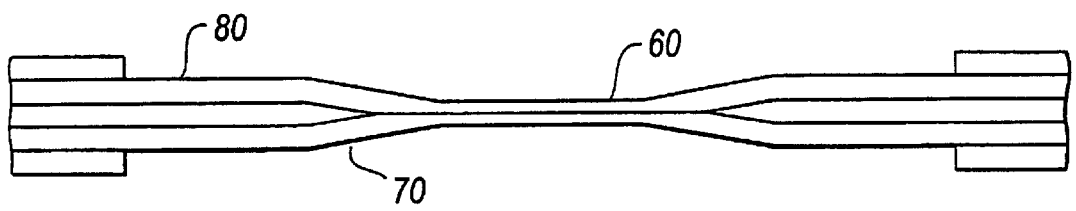

It is known to heat-treat and stretch standard fibers in order to produce a stretched and narrowed region with optical properties different from those of the rest of the fiber (FIGS. 2a and b). In FIG. 2a, the fiber is shown held by clamps 30 and is pulled in opposing directions parallel to its longitudinal axis 40. Heat 50 is applied to the fiber. The result of that treatment is shown in FIG. 2b: a waist 60 is formed in the fiber. The cross-sectional area of the core 10 is greatly reduced and the cladding 20 is also significantly narrowed. There is a transitional region 70 between the waist 60 and the rest of the fiber 80.

Figure 3:
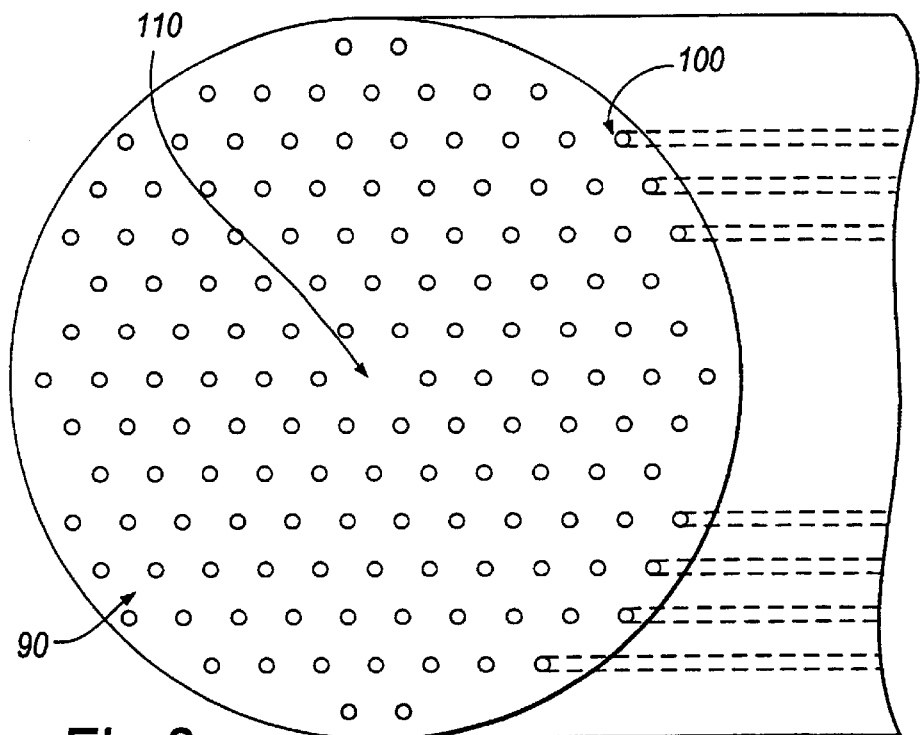
FIG. 3 is a schematic cross-sectional view through a photonic crystal fiber of the prior art.

A typical photonic crystal fiber, shown in FIG. 3, comprises a strand of transparent bulk material 90 (e.g. silica) with a lattice of holes 100, which run along its length. The holes are arranged at the vertices and centres of tesselating regular hexagons. The holes have a regular period, broken by the omission of one hole near the centre of the fiber. The region 110 of the fiber surrounding the site of the missing hole has the refractive index of the bulk material 90. The refractive index of the remainder of the fiber is attributable to the refractive index of both the bulk material 90 and the air in the holes 100. The refractive index of air is lower than that of, for example, silica and, consequently, the 'effective refractive index' of the material with the holes is lower than that of the region 110 surrounding the missing hole. The fiber can therefore confine light approximately to the region 110, in a manner analogous to waveguiding by total internal reflection in standard fibers. The region 110 is therefore referred to as the 'core' of the photonic crystal fiber.

Figure 4:
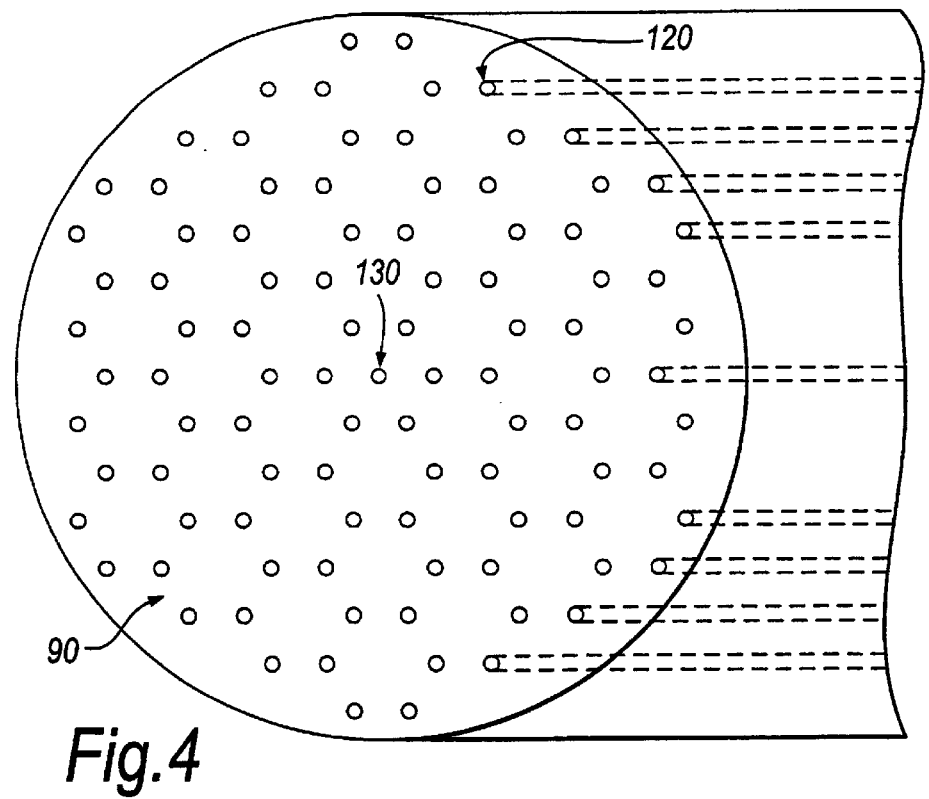
FIG. 4 is a schematic cross-sectional view through another photonic crystal fiber of the prior art.

In another form of photonic crystal fiber, photonic band gap guidance acts to confine light to the fiber 'core'. In the example of such a fiber shown in FIG. 4, there is a matrix of holes 120 in bulk material 90. The holes are arranged at the vertices (but not the centres, cf. FIG. 3) of regular hexagons. The regularity of the matrix is again broken by a defect, but it is, in the illustrated example, an additional hole 130 at the centre of one of the lattice hexagons, that hexagon being near the centre of the fiber. The area surrounding the additional hole 130 can again be referred to as the core of the fiber. Disregarding (for the moment) hole 130, the periodicity of holes in the fiber. results in there being a band-gap in the propagation constants of light which can propagate in the fiber. The addition of hole 130 effectively creates a region that can support propagation constants different from those supported in the rest of the fiber. If some of the propagation constants supported in the region of hole 130 fall within the band-gap of propagation constants forbidden in the rest of the fiber then light having those propagation constants will be confined to the core and propagate therein. Note that because the hole 130 is a low-index defect (it results in air being where bulk material would otherwise be), total internal reflection effects are not responsible for that waveguiding.

Figure 5:
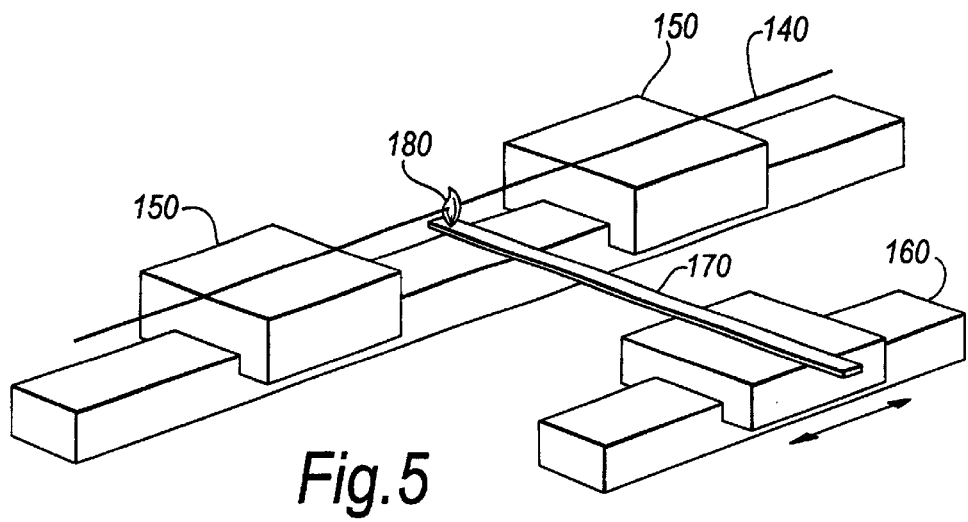
FIG. 5 is a schematic view of an arrangement for carrying out heat-treatment of a fiber.

A set-up suitable for use in heat-treatment of a, photonic crystal fiber is illustrated in FIG. 5. The fiber 140 is clamped to stages 150, which are in a fixed position; there is no deliberate stretching of the fiber 140. A burner stage 160, having a burner arm 170 is arranged so that a flame 180 heats a portion of fiber 140 between the stages 150. It should be noted that many other heating mechanisms are suitable for carrying out the invention, including, for example, heating with an electric heater or the beam of a carbon dioxide laser.

Figure 6:
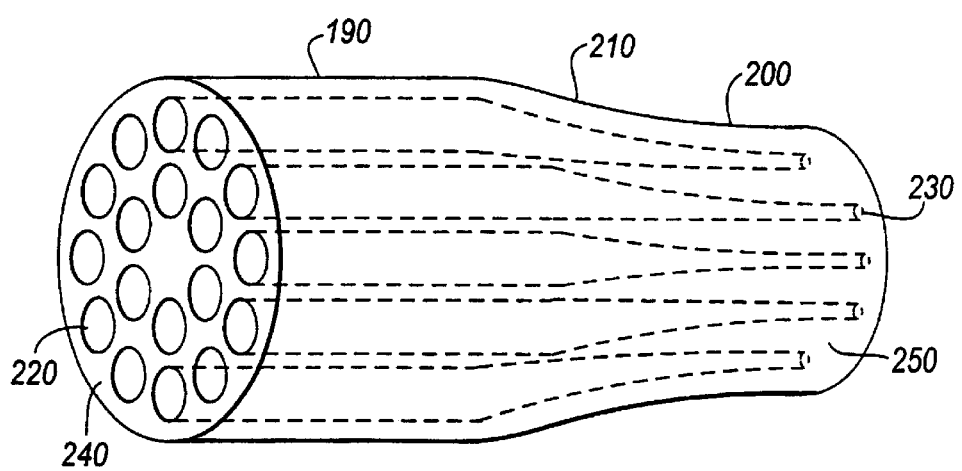
FIG. 6 is a schematic view showing the effect of heat treatment on a photonic crystal fiber.

An example of the effects of heat treatment on a photonic crystal fiber are shown in FIG. 6. There is a heat-treated region 200, an untreated region 190 and a transition region 210. In the example shown, portions 230 of holes in the heat-treated region 200 can be seen to have partially collapsed, when compared with portions 220 in the untreated region 190. The cross-sectional area of each of at least some of the holes therefore varies along the length of that hole. The overall diameter of the fiber will also reduce slightly, although the cross-sectional area of glass 240 in the untreated region 190 will be much the same as that of glass 250 in the treated region 200.

Figure 7:
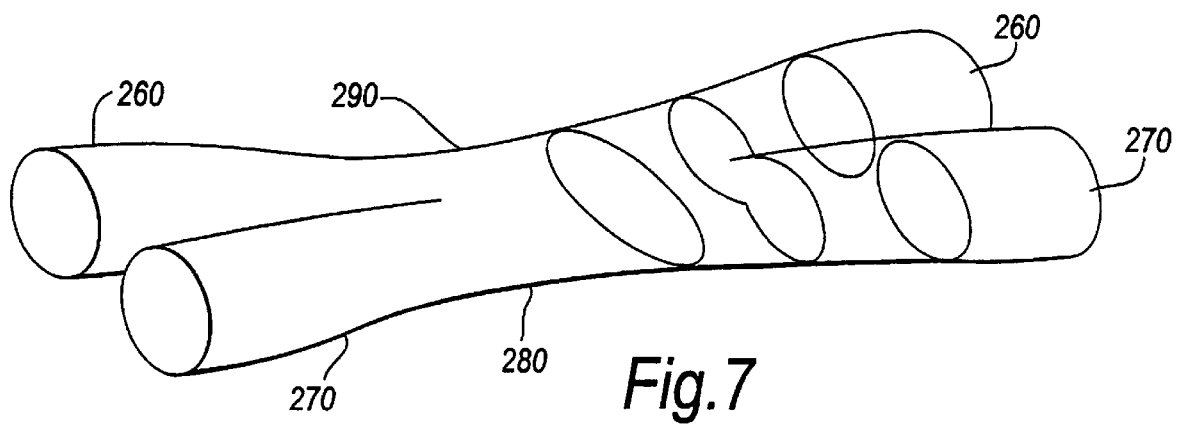
FIG. 7 is a schematic view of a directional coupler or beam-splitter.

FIG. 7 shows the structure of an optical device that could be made using the photonic crystal fiber of the invention, namely a directional coupler or beam-splitter. A region 280, 290 in each of two photonic crystal fibers 260, 270 is heat-treated according to the invention. Regions 280, 290 are fused together, for example simultaneously with the heat treatment or by further heat treatment. Light in the heat-treated regions 280, 290 extends into the cladding region of the fiber, because hole collapse has weakened or destroyed the refractive index difference between the cladding and the core. Light propagating in, for example, fiber 260 will be coupled into fiber 270 where the fibers are fused together in regions 280, 290.

Figure 8:
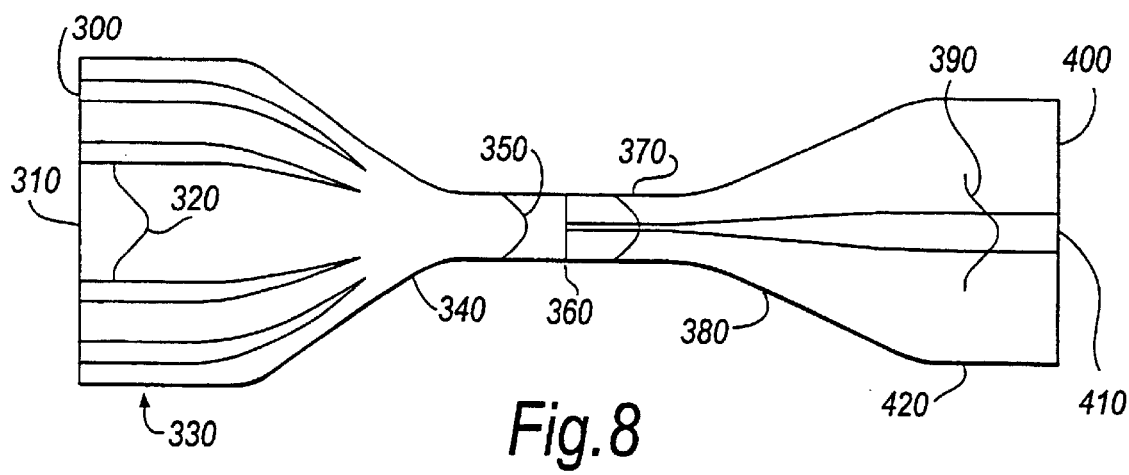
FIG. 8 is a schematic longitudinal section through a fiber splice.

Splicing of a photonic crystal fiber 330 to a standard fiber 420 is shown in FIG. 8. Each fiber is heat-treated stretched and cleaved to produce tapered regions 340, 380. In tapered region 340 of the photonic crystal 330, holes 300 are substantially eliminated. In tapered region 380 of standard fiber 420, both core 410 and cladding 400 taper whilst retaining their independent identities. The two fibers are joined by fusion splice 360.

Light mode 320 propagating in defect core region 310 spreads out to fill the full width of tapered region 340. Mode 350 in that region matches mode 370 in the tapered region 380 of standard fiber 420. Away from the tapered region 380, light is in the usual mode 390 of standard fiber 420.

Figure 9:
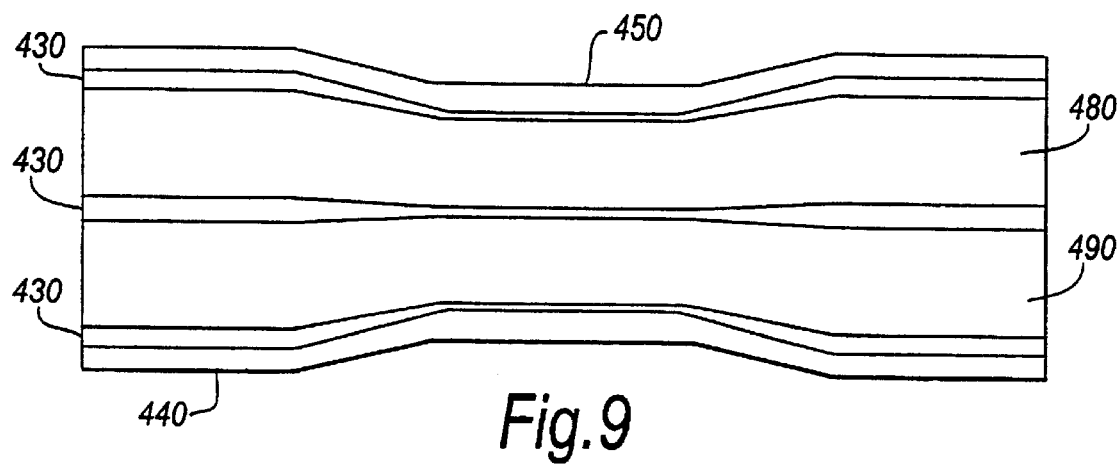
FIG. 9 is a schematic longitudinal cross-section through a multi-core fiber.

FIG. 9 shows a multi-core photonic crystal fiber 440. That Figure (like FIGS. 6, 8 and 10), shows a few holes only; there will be, of course, many holes in a real fiber. Holes 430 surround two cores 480, 490; those cores do not interact optically in untreated regions of the fiber. In heat-treated region 450, holes 430 have partially collapsed. In that region, light propagating in either core 480, 490 can interact with light propagating in the other core. The heat-treated region 450 can then act as a localised directional coupler.

Figure 10A:
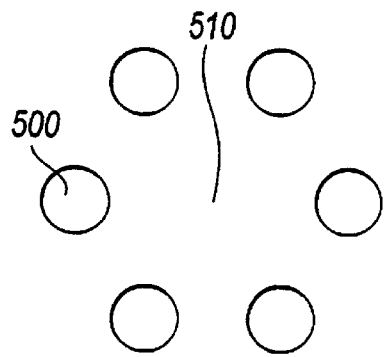
FIG. 10 is a schematic view of (a) an untreated photonic crystal fiber and (b) a photonic crystal fiber which has been heat-treated to produce birefringence.
Figure 10B:
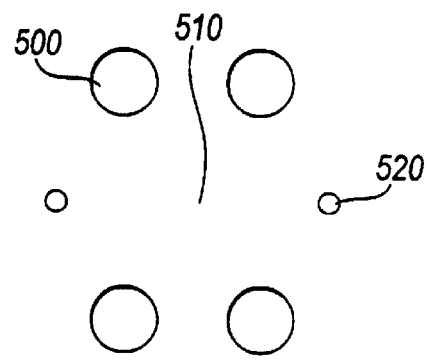

The hexagonal symmetry of holes 500 about the core 510 of the fiber of FIG. 10(a) can be broken by selective collapse of holes 520 by heat treatment to produce the two-fold rotational symmetry of FIG. 10(b). The birefringence of the fiber may be thus altered in the heat-treated region, as a fiber having such a symmetry will, in general, be birefringent.

What is claimed is:

1. A photonic crystal fiber including a plurality of longitudinal holes, in which at least some of the holes have a different cross-sectional area in a first region of the fiber, that region having been heat-treated after fabrication of the fiber, from their cross-sectional area in a second region of the fiber, wherein the optical properties of the fiber in the heat-treated region are altered by virtue of the change in cross-sectional area of holes in that region.

2. A photonic crystal fiber as claimed in claim 1, in which at least some of the holes have expanded in the heat treated region.

3. A photonic crystal fiber as claimed in claim 1, in which all of the holes have expanded in the heat treated region.

4. A photonic crystal fiber as claimed in claim 1, in which at least some of the holes have partially collapsed in the heat-treated region.

5. A photonic crystal fiber as claimed in claim 1, in which at least some of the holes have collapsed completely in the heat-treated region.

6. A photonic crystal fiber as claimed in claim 1, in which all of the holes have collapsed completely in the heat-treated region.

7. A photonic crystal fiber as claimed in claim 1, in which the pattern of hole collapse and/or expansion is not circularly symmetric.

8. A photonic crystal fiber as claimed in claim 7, in which the birefringence of the fiber is altered by the lack of circular symmetry.

9. A photonic crystal fiber as claimed in claim 1, in which the fiber has been narrowed in the heat-treated region.

10. An optical device including a photonic crystal fiber as claimed in claim 1.

11. A mode-field transformer, including a photonic crystal fiber as claimed in claim 1, the transformer being arranged so that a guided mode propagating through the transformer will have its field distribution changed by propagation through the heat-treated region of the photonic crystal fiber.

12. A multi mode to single mode transformer or mode filter, including a photonic crystal fiber as claimed in claim 1, in which the untreated regions of the fiber are multi mode and the heat-treated region is single mode for at least one wavelength of light.

13. A fiber input- or output-coupler, including a photonic crystal fiber as claimed in claim 1, in which the photonic crystal fiber is cleaved in the heat-treated region.

14. A fiber input- or output-coupler according to claim 13, the coupler being arranged so that, when a mode is propagating through the coupler, the mode pattern at the cleaved face will substantially match the mode shape of an external optical element.

15. A fiber input- or output-coupler according to claim 14, in which the external optical element is a diode laser.

16. A fiber splice, including a fiber input- or output-coupler according to claim 13, in which the fiber coupler is joined to one or more other fibers.

17. A fiber splice according to claim 16, in which the fiber coupler is joined to one or more other fibers by fusion.

18. A fiber splice according to claim 16, in which the fiber coupler is joined to one or more other fibers by an adhesive.

19. A fiber splice according to claim 16, in which the fiber coupler is joined to one or more other fibers by abutment.

20. A fiber splice according to claim 16, in which at least one of the one or more other fibers is a cleaved photonic crystal fiber.

21. A fiber splice according to claim 20, in which at least one of the one or more other fibers is a fiber coupler according to claim 13.

22. A fiber splice according to claim 16, in which one or more of the other fibers is a standard fiber.

23. A fiber splice according to claim 22, in which at least one of the one or more other fibers that is a standard fiber has been tapered by stretching during heat treatment and then cleaved.

24. A photonic crystal fiber as claimed in claim 1, which is arranged so that interaction of light, propagating in the photonic crystal fiber, with the external environment is enhanced or suppressed in the heat-treated region.

25. An optical device including a photonic crystal fiber according to claim 24.

26. An optical device according to claim 25, in which the optical device is a mode-field transformer.

27. An optical device according to claim 25, in which the interaction facilitates measurement of a measurand of the fiber's external environment.

28. An optical device according to claim 25, in which the interaction is with an external optical element.

29. An optical device according to claim 28, in which the optical element comprises one or more other optical fibers.

30. An optical device according to claim 29, in which at least one of the one or more other optical fibers is a photonic crystal fiber according to claim 24.

31. An optical device according to claim 28, in which at least one of the at least one other optical fibers is a standard fiber.

32. An optical device according to claim 29, in which at least two fibers have been at least partly fused together by heat treatment.

33. A photonic crystal as claimed in claim 1, which is arranged so that interaction of light, propagating in the photonic crystal fiber, with a structure introduced elsewhere in the fiber is enhanced or suppressed in the heat-treated region.

34. An optical device including a photonic crystal fiber according to claim 33.

35. An optical device according to claim 34, in which the introduced structure is at least one other core region in the photonic crystal fiber.

36. An optical device according to claim 34, in which the introduced structure is a grating.

37. An optical device according to claim 34, in which the introduced structure is a region of doped material.

38. A directional coupler including an optical device as claimed in claim 33.

39. A spectral filter including an optical device as claimed in claim 33.

40. An optical sensor including an optical device as claimed in claim 33.

41. A laser or optical amplifier including an optical device as claimed in claim 33.

42. A laser or optical amplifier including a directional coupler according to claim 38.

43. A method of producing a photonic crystal fiber, including the following steps:
   (a) fabricating a photonic crystal fiber having a plurality of longitudinal holes;
   (b) heat-treating a region of the fiber so that at least some of the holes in that region have a different cross-sectional area from their cross-sectional area in regions of the fiber which have not been heat-treated, the optical properties of the fiber in the heat-treated region being altered by changing the cross-sectional area of holes in that region.

44. A method according to claim 43, in which at least some of the holes are pressurized during the heat treatment.

45. A method according to claim 44, in which all of the holes are pressurized during the heat treatment.

46. A method according to claim 43 in which the heat treatment causes at least some of the holes within the fiber to collapse at least partially in the treated region.

47. A method according to claim 43, in which the heat treatment causes at least some of the holes within the fiber to collapse completely in the treated region.

48. A method according to claim 47, in which the heat treatment causes all of the holes within the fiber to collapse completely in the treated region.

49. A method according to claim 43, in which the heat treatment is applied in a non-circularly-symmetric manner, so that a pattern of hole collapse and/or expansion that is not circularly symmetric results.

50. A method according to claim 49, in which the birefringence of the fiber is altered in the heat-treated region.

51. A method according to claim 43, in which the fiber is narrowed locally by stretching during the heat treatment.

52. A method according to claim 43, in which the heat treatment changes the physical and/or chemical state of at least some of the material within the fiber.

* * * * *